Nov. 28, 1967 D. C. WENDELL, JR 3,355,578

INFORMATION PROCESSING SYSTEM UTILIZING A SATURABLE REACTOR FOR ADDING THREE VOLTAGE PULSES

Filed July 7, 1964 2 Sheets-Sheet 1

INVENTOR.
DOUGLAS C. WENDELL JR.
BY Vincent L. Carney
ATTORNEY

INVENTOR.
DOUGLAS C. WENDELL JR.
BY Vincent L. Carney
ATTORNEY

United States Patent Office 3,355,578
Patented Nov. 28, 1967

3,355,578

INFORMATION PROCESSING SYSTEM UTILIZING A SATURABLE REACTOR FOR ADDING THREE VOLTAGE PULSES

Douglas C. Wendell, Jr., Malvern, Pa., assignor to Burroughs Corporation, Detroit, Mich., a corporation of Michigan Filed July 7, 1964, Ser. No. 380,762
12 Claims. (Cl. 235—175)

This invention relates to a system for using and operating on codes formed of electrical voltages, and more particularly, relates to a novel method and apparatus for performing functions on electrical pulse-script code.

In data processing systems and in switching circuitry, it has become commonplace to use pulse-script code in the form of electrical impulses to represent the information or to transmit the information which is to perform switching operations. In such systems the presence of a voltage pulse indicates one possible value of a binary bit while the absence of a voltage pulse indicates the other possible value of the binary bit. The information content of words made of these binary bits is altered through components which generate output voltage pulses in response to predetermined combinations of input voltages. Also, various mechanical switching operations such as selecting are performed in response to input combinations of these voltage bits.

In handling binary pulse-script information, components are used which have two possible electrical outputs and which respond to binary inputs. These components provide one output voltage upon receiving a coincidence of binary bits having the same voltage level and provide another output when there is a lack of such coincidence. However, a large number of these components are necessary to make up other operational units. It is therefore desirable to use components which do not operate completely in the binary mode, but which are capable of providing output voltages having more than two voltage levels. Units having components of this kind, using a code in which the individual characters have more than two possible values, are able to perform operations with fewer individual components. Accordingly, it is an object of this invention to provide an improved information processing system.

It is a further object of this invention to provide a method and apparatus which uses a code in which the characters may have more than two values to process an input binary code.

It is a still further object of this invention to provide three-valued (ternary) logic circuits which operate as translators, coincidence-detectors, full-adders, and waveform generators on binary input codes.

In accordance with the above objects an electrical component is provided which employs magnetic cores of approximately rectilinear characteristics to achieve a three-valued logic. The logic component has three inputs each of which is connected to a winding around a core having sufficient turns so that an input pulse on one winding creates less magnetomotive force (MMF) than that necessary to saturate the core. An input on only one of the input windings, then, does not switch the core and therefore does not provide an output voltage in an output winding. The coincidence of two input pulses on two of the input windings, however, switches the core slowly to provide a substantially rectilinear output voltage. The coincidence of inputs on all three windings saturates the core more rapidly to produce an earlier spike of output voltage in an output coil.

Cores wound in this manner can be combined to provide an intermediate three-value logic system for processing digital input signals in an economical manner. Gating and timing circuits may be utilized on the outputs to distinguish between the rectilinear output pulses and the higher peak of voltage as an output pulse or the three-value logic may be used in conjunction with other magnetic cores to perform other processes.

The invention and the above-noted and other features thereof will be understood more clearly and fully from the following detailed description when considered with reference to the accompanying drawings in which.

Figure 6:
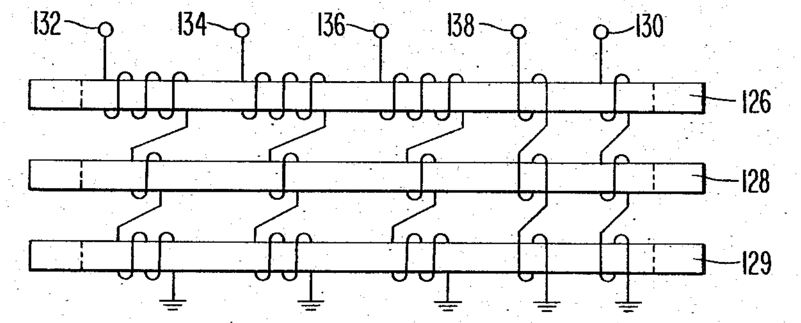
Figure 7:
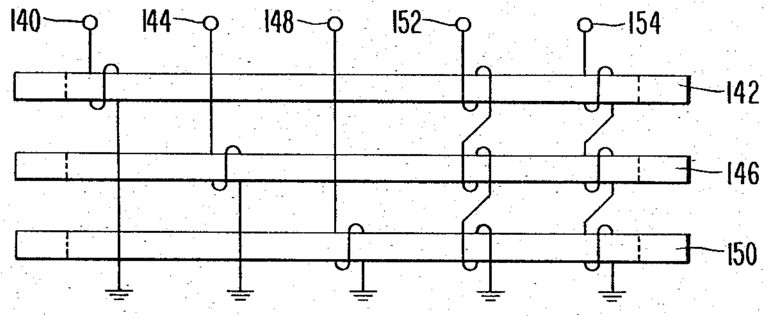

FIGURE 6 is a schematic circuit diagram of a three-core adder having both concurrent and stored outputs but having a different code for the stored output than for the consurrent output; and FIGURE 7 is a schematic circuit diagram of a digital converter having an analog output according to an embodiment of the invention in which the amplitude of the output is proportional to the number of received input pulses.

Figure 1:
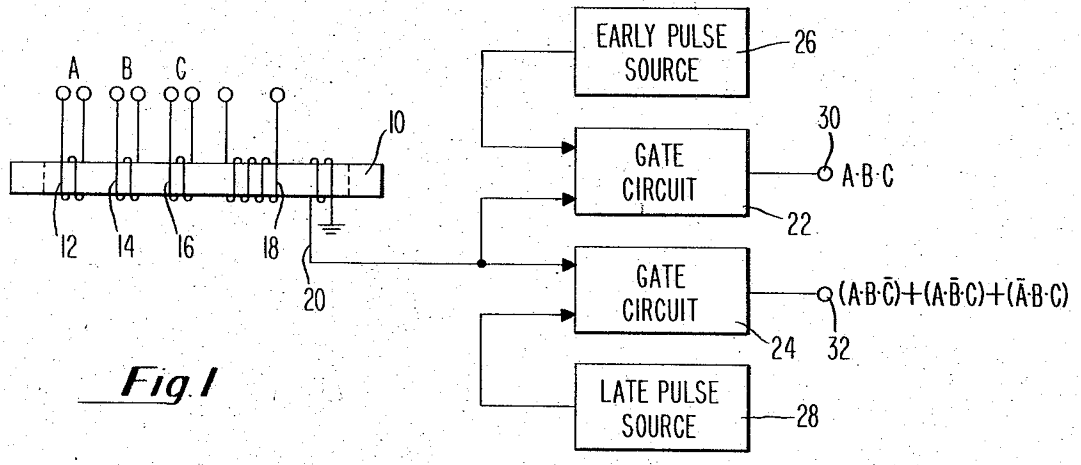
FIGURE 1 is a schematic circuit diagram of one embodiment of the invention.

In FIGURE 1 a schematic circuit diagram of a double and triple coincidence detection portion of an adder circuit is shown illustrating an embodiment of the invention. The ferromagnetic core 10 has three input windings, 12, 14 and 16 adapted to receive the binary input pulses A, B and C respectively. The three input windings 12, 14 and 16 are wound in the same direction. A reset winding 18 is wound in the opposite direction.

An output winding 20 is electrically connected to the two coincident gate circuits 22 and 24. A source of clock pulses 26 is electrically connected to the control input of the gate 22 and another source of clock pulses 28 which occurs after the clock pulses from the source 26 has its output electrically connected to the control input of the gate circuit 24. The gate circuit 22 provides its output to the terminal 30; the gate 24 provides its output to the terminal 32.

The inputs A, B and C each have the same amplitude of current. When passed through the windings 12, 14 and 16 each of them creates an MMF having a magnitude of one-half that necessary to saturate the ferromagnetic core 10. A similar pulse applied to the reset winding 18 but of saturating amplitude reverses the magnetic orientation of the ferromagnetic core.

If only the input A is applied to the winding 12, no significant output is induced in the output winding 20 since the core is not driven to saturation. However, if the input A is applied to the winding 12 and the input B is applied to the winding 14 in coincidence, the core 10 is saturated to provide a substantially rectilinear output pulse on the winding 20. If the input A is applied to the winding 12, the input B is applied to the winding 14, and the input C is applied to the winding 16 in coincidence, the core 10 is switched much faster than in the previous case to provide a sharp voltage output on the output winding 20.

Is can be seen that the nature of the output is different when inputs A, B and C are applied than it is when only the inputs A and B are applied. It is clear that the ferromagnetic core 10 may be operated to generate a code, each character of which has three possible values: essentially zero output voltage, a long substantially rectilinear voltage, and a high-amplitude, narrow output voltage pulse.

The presence of the long rectilinear output pulse responsive to two coincident input pulses is detected by the gate circuit 24 and the late pulse source 28 as indicated by logical notation terminal 32 in FIGURE 1. When the inputs A, B and C are all applied, a pulse is applied to the input of the gate circuit 22 which coincides with the clock pulse of the early pulse source 26 to provide an output pulse on the terminal 30 as indicated in logical notations. The presence of the low rectilinear voltage output created by any two of the inputs A, B and C in coincidence is detected by the gate circuit 24 and the late pulse source 28. The late pulse source 28 provides input pulses to the gate circuit 24 a short time after inputs are applied to the windings 12, 14 and 16. These pulses do not open the gate 24 while the narrow high-voltage pulse, responsive to the coincidence of three inputs on the core, is present on the output winding 20. It opens the gate 24, however, during the time that the low output voltage indicating the presence of two inputs to the core 10 is on the output coil 20. This causes a voltage to be applied to the output terminal 32 as indicated by the logical language noted near that terminal.

It can be seen that the double and triple coincidence detector adder component of FIGURE 1 is based on an electric code in which each character may have one of three values rather than two values as in the more common binary code used in data processing and switching equipment. The only requirement is that the saturable reactor 10 be capable of providing output voltages with substantially different waveforms and that the different waveforms be capable of being detected. Here, a low, long, rectilinear voltage, indicating a slow switching of a core to saturation, and a short pulse, indicating a more rapid switching of the core, are used. The output from the strobing network used to detect this difference on terminals 30 and 32 may be standardized with conventional pulse shaping circuits. The core is reset after each operation by passing a current through the reset winding 18.

Figure 2:
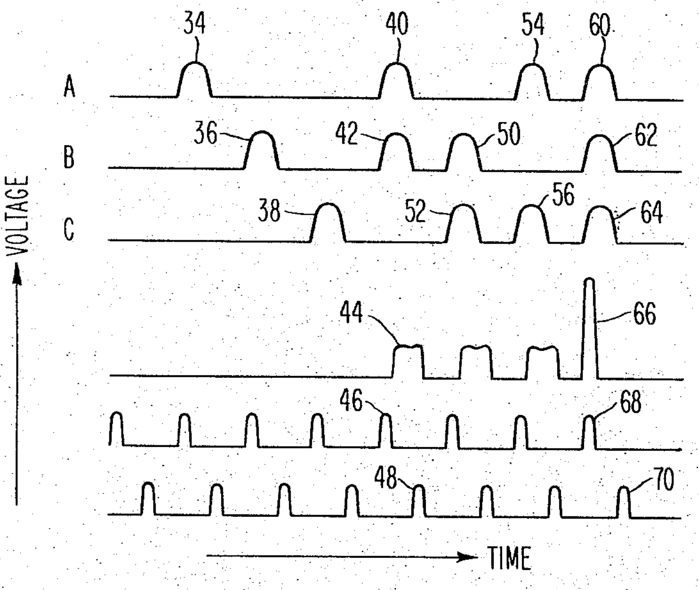
FIGURE 2 is a graph showing the waveforms of the input and output pulses applied to FIGURE 1 having ordinates of voltage and common abscissas of time.

In FIGURE 2 a graph is provided having six curves one under the other with common abscissas of time and with ordinates of voltage, showing the relationship between the inputs, the output and the clock pulses of the double and triple coincidence detection portion of an adder of FIGURE 1. The curves 34, 36 and 38, represent input pulses occurring at different times on the windings 12, 14 and 16 respectively of the apparatus illustrated in FIGURE 1. A reset voltage occurs on coil 18 between each of the input pulses. As is shown, there is essentially no output pulse resulting from a single input pulse since a single input pulse by itself is not able to saturate the core 10.

Curves 40 and 42 represent input pulses to coils 12 and 14 which together are sufficient to just saturate the core 10 resulting in a rectilinear output pulse 44 starting after the peak of the input pulses 40 and 42. The clock pulse 46 from the early pulse source 26 occurs before this output pulse 44, but the clock pulse 48 from the late pulse source 28 occurs during the output pulse 44 and gates it to output terminal 32. Similarly, input pulses 50 and 52 on inputs 14 and 16 result in an output pulse on terminal 32 and input pulse 54 and 56 coincide on windings 12 and 16 to provide an output voltage pulse.

Input voltage pulses 60, 62 and 64, coincide on the input windings 12, 14 and 16 respectively switching the core 10 very rapidly so as to generate the early, high-amplitude voltage pulse 66 in output winding 20. This voltage pulse coincides with the clock pulse 68 from the early pulse source 26 so as to gate an output signal to terminal 30. The pulse 66 falls back to ground level before the occurrence of the clock pulse 70 from the late pulse source 28.

It can be seen that the circuit of FIGURE 1 provides the output function $A\cdot B\cdot C$ on one terminal and the function $A\cdot\overline{B}\cdot C+A\cdot\overline{B}\cdot C+A\cdot\overline{B}\cdot C$ in response to the inputs A, B and C so as to perform the function of double and triple coincidence detection. It requires very few components. It accomplishes this function through the use of characters which may have any of three values as indicated in the curve of FIGURE 2. It is clear that other rates of switching might be used to create different characters as desired. However, three-value characters lend themselves to circuitry with convenience.

Figure 3:
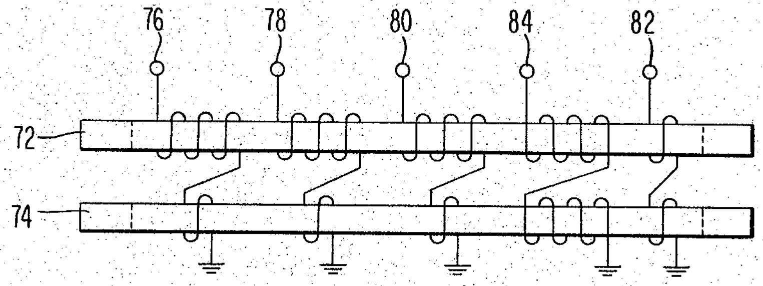
FIGURE 3 is a single output terminal full-adder which is an embodiment of the invention.

In FIGURE 3 a schematic circuit diagram of a single output terminal full-adder is shown having two ferromagnetic cores 72 and 74, each of which has substantially rectilinear magnetization characteristics. Three input terminals 76, 78, and 80 are adapted to receive binary input signals and an output terminal 82 provides a long, low-amplitude output voltage indicating a unit one and a short, sharp spike voltage indicating a carry value. These units may be separated by a strobing circuit such as that disclosed in FIGURE 1. The input terminals 76, 78 and 80 are each connected to windings around the core 72 in the same direction and having a sufficient number of turns so that an input binary "one" digit provides an MMF to the core 72 that is more than one-third of but less than one-half of the saturating MMF of the core 74, but slightly more than the saturating value of the core 72. A reset terminal 84 is electrically connected to series reset windings on the cores 72, and 74, both in the opposite direction as the input windings and having a sufficient number of turns to reset both cores. Each core has an output winding. The output windings are connected in series with each other and output terminal 82.

An input voltage on one of the three terminals 76, 78 or 80 switches the core 72 but does not affect core 74. The switching of the core 72 induces a voltage in the output winding to provide a low-amplitude long voltage pulse to the output terminal 82. This voltage indicates a binary "one." Coincident input pulses of any two of the three input terminals 76, 78 and 80 drives the core 72 to saturation very rapidly to produce a high-amplitude short voltage pulse on terminal 82, which pulse is indicated as a carry signal by a strobing network. Input pulses on all three of the input terminals 76, 78 and 80 switches the core 72 rapidly to provide a short, high output voltage to the terminal 82 indicating a carry and also switches the core 74 more slowly to provide a low-amplitude long voltage pulse indicating the unit one.

While the cores 72 and 74 are assumed to be identical in coercive force and the magnetic effects of the current are assumed to be proportional to the number of turns, it is naturally possible to control the effective current by using cores of appropriately different coercive forces or of the same coercive force but of different diameters. Similarly, the output waveform indicating a unit digit and the output waveform indicating a carry digit may be separated by threshold circuits rather than by the strobing network discussed above.

Figure 4:
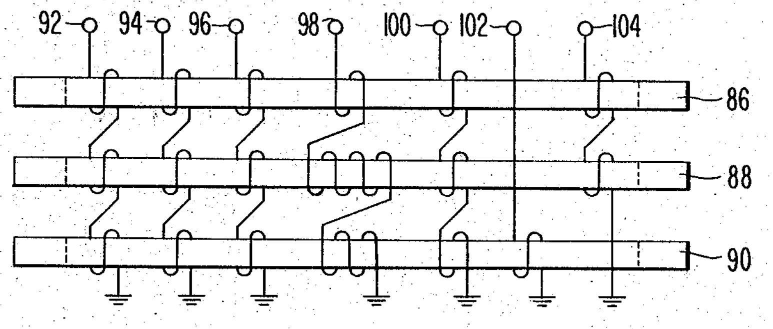
FIGURE 4 is a schematic circuit diagram of a three-core adder which has the property of giving outputs concurrently with inputs that set the cores and also upon re-setting of the cores; but in a different code.

In FIGURE 4 a three-core adder is shown which has the property of giving outputs concurrently with inputs and also of storing the output information in such a fashion that it repeats when the cores are reset. The adder, shown schematically in FIGURE 4, operates in two modes because the three ferromagnetic cores 86, 88 and 90, which are used in the adder have different coercivities.

The three input terminals 92, 94 and 96 are each electrically connected to a different series combination of windings on the three cores 86, 88 and 90. All of the windings have the same number of turns so that an input pulse on any one of the terminals creates the same MMF in each of the cores. A reset terminal 98 is electrically connected to three series reset windings, one on each of the cores 86, 88 and 90. The reset windings are in the opposite direction as the windings connected to the input terminals. There are twice as many turns on the reset winding around core 90 as that around 86 and three times as many turns around the core 88 as around the core 86. A first output terminal 100 is electrically connected to three series windings on the cores 86, 88 and 90 all having the same number of turns but with the winding on core 90 being in the opposite direction as that of the core 88 and 86. A second output terminal 102 is connected to another winding on core 90. A third output terminal 104 is electrically connected to two series windings on the two cores 86 and 88 respectively, which windings are in the same direction.

Terminal 104 is the concurrent output terminal or the terminal which provides the sum of the binary digits applied to input terminals 92, 94 and 96 at the same time that these inputs are applied. A single input pulse applied to any one of the terminals 92, 94 and 96 sets core 86 to provide the low-amplitude recetilinear output voltage on terminal 104 indicating a binary "one." The core 88 and the core 90 are not set since they have higher coercivities than the core 86. Two coincident input pulses on any two of the input terminals 92, 94 and 96 set core 86 rapidly to generate an early high-amplitude voltage pulse on the terminal 104. The core 90 is also set since it requires only twice as much MMF as the core 86, but this does not result in a low-amplitude rectilinear output pulse on terminal 104 since there is no winding on core 90 connected to this terminal. The core 88 is not set since it requires three times as much MMF as the core 86. If an input is applied to all three of the input terminals 92, 94 and 96, the core 86 is set rapidly to provide the high-amplitude output pulse on terminal 104 indicating a carry and the core 88 is set slowly so as to result in a low-amplitude rectilinear output pulse on the same terminal indicating a unit one output.

The output terminals 100 and 102 provide an output signal indicating the sum of the inputs applied to input terminals 92, 94 and 96 when the cores 86, 88 and 90 are reset by a voltage pulse applied to reset terminal 98. These output pulses on terminals 100 and 102 are in the more conventional binary form rather than the three-value form which appears at terminal 104 concurrently with the inputs.

A single input on any one of the input terminals 92, 94 and 96 only sets core 86. When the reset pulse is applied to terminal 98 the resetting of core 86 generates a voltage pulse on the input terminal 100. No pulse appears at terminal 102 since it has a winding only on core 90, which core has not been set. The output on terminal 100 indicates the unit one.

Input pulses on any two of the input terminals 92, 94 and 96 causes the core 86 and the core 90 to be set. These cores are reset by an input pulse on terminal 98. This generates a voltage pulse having one polarity in the winding connected to output terminal 100 on core 86 and a voltage pulse of the opposite polarity in the winding connected to terminal 100 wound around the core 90. These pulses are of the same amplitude since the coercivity of the core 90 is twice that of the core 86 but the core 90 has twice as many reset windings around it as the core 86. These pulses cancel out so there is no output on the terminal 100. On the other hand, an output pulse appears on terminal 102 because of its one winding on the core 90 to indicate a carry. If an input signal is applied in coincidence to each of the input terminals 92, 94 and 96, each of the three cores 86, 88 and 90 are set. When they are reset, an output pulse appears at terminal 100 indicating a unit "one" since cores 86 and 88 each generate one unit of voltage having the same polarity and the core 90 generates a similar unit of voltage having the opposite polarity. Two units cancel and one appears in the output terminal 100. The core 90 also generates one unit of voltage which appears at terminal 102 indicating a carry.

Figure 5:
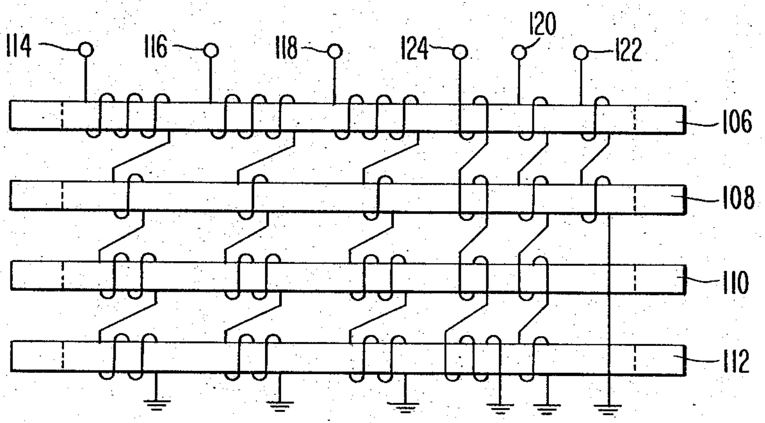
FIGURE 5 is a schematic circuit diagram of an adder according to the invention in which outputs are produced concurrently with inputs and also upon resetting of the cores in the same code.

In FIGURE 5 a schematic circuit diagram of an adder is shown which provides concurrent outputs in a ternary code and also stores outputs in a ternary code. This adder uses four ferromagnetic cores 106, 108, 110, 112. Each of these four cores has the same coercivity. Three input terminals 114, 116 and 118 are each electrically connected to a different series of four windings: each winding being around a different one of the four cores 106–112. Each of the series of four input windings are the same for the three input terminals and each have a sufficient number of turns so that one input pulse on any input terminal saturates the core 106, provides one-third the MMF necessary to switch the core 108, and provides two-thirds of the MMF necessary to switch the cores 110 and 112. Therefore, one input pulse on either of the input terminals 114, 116 or 118 sets only core 106; coincident input pulses on any two of the input terminals 114, 116 or 118 sets cores 106, 110 and 112; and coincident input pulses on each of the three input terminals 114, 116 and 118 sets all four of the cores 106, 108, 110 and 112.

The output terminals 120 and 122 each provide concurrent output pulses that indicate the sum of the binary inputs in the terminals 114, 116 and 118. In addition to this, output terminal 120 provides stored output signals in ternary form. The output terminal 120 is electrically connected to four output windings which are in series with each other. Each of these four output windings is wound around one of the cores 106, 108, 110 and 112 with the winding around core 110 being in the opposite direction from the other windings. All four windings have the same number of turns. The output terminal 122 is electrically connected to two series connected windings wound in the same direction: one around core 106 and the other around core 108. Both terminal 120 and 122 receive the same concurrent outputs because the windings around core 110 and 112, which are electrically connected to 120, generate pulses that cancel each other when these two cores are set by input pulses.

In discussing the generation of concurrent output pulses only the cores 106 and 108 need be considered and only one of the two output terminals 120 and 122 need be considered. When an input pulse is applied to only one of the three input terminals 114, 116 and 118 the core 106 is set but the core 108 is not set. This causes a low-amplitude, rectilinear output voltage to appear at the output terminals indicating a unit output. When coincident input pulses are applied to any two of the three input terminals, the core 106 is set very rapidly and the core 108 is not switched so that a high-amplitude, short, output pulse appears at the output terminals indicating a carry signal. When current coincident input pulses are applied to all three of the input terminals, both core 106 and core 108 are switched with the core 106 being switched very rapidly so that an early, high-amplitude, voltage pulse followed by a later low-amplitude, rectilinear, voltage pulse appears at the output terminals indicating both a unit one and a carry.

Only terminal 120 provides ternary stored output signals for the adder of FIGURE 5. These outputs are generated upon the application of a reset pulse to a terminal 124 which is electrically connected to four reset windings each of which is wound in the same direction on a different one of the four cores 106, 108, 110 and 112. However, there are twice as many windings in the reset winding around core 112 as there are in each of the other three cores.

When an input pulse is applied to any one of the three input terminals 114, 116 and 118, only the core 106 is set. When a reset pulse is applied to terminal 124, the resetting of the core 106 generates a low-amplitude, rectilinear, output voltage on terminal 120 indicating a unit readout. When two coincident pulses are applied to any two of the input terminals, cores 106, 110 and 112 are switched. Now, when an input pulse is applied to reset terminal 124, these three cores are reset generating two low-amplitude, rectilinear pulses of opopsite polarity from the cores 106, and 110 having windings in the opposite direction connected to terminal 120 and also an early, high-amplitude voltage generated by core 112. The high-amplitude voltage is generated by core 112 because it is switched more rapidly due to the extra turns on the reset winding of this core. The two low-amplitude pulses cancel having only the high-amplitude pulse to indicate a carry.

When coincident inputs are applied to all three of the input terminals, all four of the cores are switched. When a reset pulse is applied to terminal 124 after this, the low-amplitude voltage pulses of opposite polarity are generated in the output windings connected to terminal 120 by the cores 106 and 110. In addition to this, another low-amplitude rectilinear voltage is generated by the core 108 and an early, high-amplitude voltage pulse is generated by the core 112 at the output terminal 120. This provides a unit one signal and a carry signal.

In FIGURE 6 a schematic circuit diagram of another adder is shown having three cores 126, 128 and 129. It has a slightly different presentation of output information at an output terminal 130 in response to inputs at the three input terminals 132, 134, and 136.

Each of the input terminals is electrically connected in series with three different input windings: one on core 126 having enough turns to switch this core with an input pulse; one on core 128 wound in the same direction and in series with the input winding on core 126, and having one-third the number of turns necessary to switch core 128 with an input pulse; and one on core 129, wound in the same direction as the winding on core 128, being in series with the input winding on core 128 and having sufficient turns to provide two-thirds of the MMF necessary to switch the core 129.

Similarly, the output terminal 130 is electrically connected to a series combination of three windings: one on each of the three cores but with the winding on the core 129 being in the opposite direction as that of the winding on cores 126 and 128. Each of the three cores 126, 128 and 129 has a reset winding on it. The three reset windings are connected in series with each other and with a reset input terminal 138.

An input pulse applied to any of the input terminals 132, 134 and 136 sets only core 126 to provide a low-amplitude rectilinear output at terminal 130 indicating a unit one. Coincident inputs on any two of the three input terminals sets cores 126 and 129 resulting in a hgh-amplitude spike of one polarity from core 126 due to its rapid switching and a low-amplitude pulse of the opposite polarity from core 129 since its output winding is wound in the opposite direction as that of the output windings on the other cores. Coincident input pulses on all three of the inputs result in a high-amplitude spike from the core 126 together with a low-amplitude pulse of the same polarity from core 128 and a smaller spike of voltage in the opposite direction from core 129.

In FIGURE 7 a schematic circuit diagram is shown of a digital adder with an analog output having a first input terminal 140 electrically connected to the winding on the first core 142, having a second input terminal 144 electrically connected to a winding around a second core 146, and having a third input terminal 148 electrically connected to a winding around a third core 150. Each of the three cores 142, 146 and 150 has a reset winding; each of the reset windings are connected in series with each other and with the reset input terminal 152. An output terminal 154 is electrically connected to a series combination of three windings: one on each of the cores 142, 146 and 150 each being wound in the same direction, and each having the same number of turns. The output on terminal 154 is proportional to the number of simultaneous inputs applied to the input terminals 140, 144 and 148, in concurrent operation. The amplitude of the output at 154 is also proportional to the number of signals received, simultaneous or not, upon a reset pulse on terminal 152.

It can be seen that this invention provides a method and apparatus for converting a binary code into a code in which the characters have more than two values. This results in an economy of components and a flexibility of operation which cannot be obtained with a binary code.

The apparatus of this invention is also capable of other uses, such as that of a wave generator under the control of binary input pulses. It can be seen that the use of a ternary code according to this invention results in an economy of logical operations and components. It is also readily apparent that this invention may be used in switching circuits with attendent advantages.

Obviously, many modifications and variations of the invention are possible in the light of the above teachings. It is therefore to be understood that, within the scope of the appended claims, the invention may be practiced otherwise than as specifically described.

What is claimed is:

1. A method of translating a code which constitutes a new use of a saturable reactor in which each character has one of two possible values indicated by an electrical voltage into a code in which each character has more than two values as indicated by electrical voltages, comprising the steps of:

applying voltage pulses representing each character of a word of said first code concurrently to separate inputs of a saturable reactor, none of which is itself capable of causing saturation of the reactor, two of which will cause the reactor to saturate, and more than two of which will saturate the saturable reactor at a faster rate;

detecting the voltage output from said saturable reactor which corresponds in magnitude to the rate at which said saturable reactor is saturated by said voltage pulses of said first code, the waveform of said output voltage indicating the number of coincident input pulses representing the characters of said word of said first code and discriminating between the different output voltage waveforms for determining the number of coincident input pulses representing the characters of said word of said first code.

2. The new method of utilizing a ferromagnetic core having three input windings, a reset winding, and an output winding, comprising the steps of:

applying the bits of a three bit binary word in parallel to said three input windings of said core which bits have an amplitude such that one binary "one" bit does not saturate said core but two binary "one" bits do saturate said core; and applying the voltage induced in said output winding to a utility device capable of distinguishing the waveform of the voltage caused by the rapid switching of the core upon receiving three coincident binary "one" bits from the voltage induced in the output by the slower switching of the core by two coincident binary "one" bits and from the low voltage on the output winding when only one binary "one" bit is applied to said input windings.

3. The new use of a ferromagnetic core having three input windings, a reset winding, and an output winding, comprising the steps of:

applying a series of three bit binary words in parallel bit form to said three input windings of said core, any two bits of which are being capable of switching the core when concurrently applied thereto and any three concurrent bits of which switching the core more rapidly;

applying a reset voltage to the reset winding of said core between said binary input words; and determining the time-width of the voltage occurring on said output winding upon the application of each three bit binary word to the input windings of the core for detecting the receipt of double and triple concurrent bit signals by the core.

4. The combination in a coincidence detector comprising:

saturable-reactor means, having more than two inputs and an output, for inducing a voltage on said output which corresponds in at least one characteristic to the number of said inputs to which voltages are concurrently applied; and discriminating means, electrically connected to said output, for determining said characteristic of said voltage upon said output.

5. The combination according to claim 4 in which said discriminating means comprises a strobing means for determining the time at which said voltage appears on said output.

6. The combination in a coincidence detector comprising:

saturable-reactor means, having a plurality of inputs and an output, for inducing a voltage in said output which corresponds in at least one characteristic to the number of said inputs to which voltages are applied; and discriminating means, electrically connected to said output, for determining said characteristic of said voltage upon said output comprising a strobing means for determining the time at which said voltage appears on said output, which comprises first gating means having an input electrically connected to said output and having a control input terminal;

second gating means having an input electrically connected to said output and having a control input terminal;

first clock pulse means, having its output terminal electrically connected to the control terminal of said first gate, for generating clock pulses in synchronism with the inputs to said saturable reactor means, said first gate being opened in synchronism with said inputs; and second clock pulse means, having its output electrically connected to the control input of said second gate, for generating clock pulses in synchronism with said inputs after the termination of the clock pulses from said first clock pulse generator means.

7. A triple coincidence detector comprising:

a ferromagnetic core;

first, second, and third input windings on said ferromagnetic core;

said first, second and third input windings each being adapted to receive binary signals having a first amplitude and a second amplitude;

said first, second and third input windings each having sufficient turns to create in said ferromagnetic core a magnetomotive force at least equal to one-third of that necessary to saturate said core and less than one-half that necessary to saturate said core upon receiving a binary signal having said first amplitude;

an output winding on said core; and discriminating means, electrically connected to said output winding on said core, for distinguishing the waveforms of voltage pulses on said output winding.

8. A single output terminal full-adder comprising:

a first ferromagnetic core;

a second ferromagnetic core having substantially the same coercivity as said first ferromagnetic core;

three input windings on said first core, each adapted to receive a binary input signal and each having sufficient turns so that a binary bit of one amplitude creates a magnetomotive force in said first core sufficient to saturate said first core;

three input windings on said second ferromagnetic core, each being electrically connected in series with a different one of said input windings on said first ferromagnetic core and each having a sufficient number of turns to create a magnetomotive force upon receiving a binary bit of said one amplitude which magnetomotive force is at least one-third but less than one-half of that necessary to saturate said second ferromagnetic core;

a first output winding electrically wound around said first ferromagnetic core and coupled to an output terminal; and a second output winding electrically connected in series with said first output winding and wound around said second ferromagnetic core.

9. An adder comprising:

a first ferromagnetic core having first, second, and third input windings, a reset winding, and two output windings;

a second ferromagnetic core which requires three times the magnetomotive force for saturation as said first ferromagnetic core and which has first, second, and third input windings;

said first, second, and third input windings of said second ferromagnetic core each being electrically connected in series with a different one of said first, second, and third input windings on said first ferromagnetic core;

said second ferromagnetic core having a reset winding with three times the turns of the reset winding upon said first ferromagnetic core;

said second ferromagnetic core having a first output winding in series with and in the same direction as the first output winding of said first ferromagnetic core, and having a second output winding having the same number of turns and being wound in the same direction as said second output winding of said first ferromagnetic core;

a third ferromagnetic core which requires twice the magnetomotive force for saturation as said first ferromagnetic core and having first, second, and third input windings;

said first, second, and third input winding of said third ferromagnetic core each being electrically connected in series to a different one of said first, second and third input windings of said first ferromagnetic core and said second ferromagnetic core;

said third ferromagnetic core having a reset winding in the same direction, having twice the number of turns and being in series with the reset winding of said first and second ferromagnetic core;

said third ferromagnetic core having a first output winding in series with said first output windings of said first and second ferromagnetic core with the same number of turns and wound in an opposite direction as the first output winding of said first and second ferromagnetic core; and said third ferromagnetic core having a second output winding.

10. An adder comprising:

a first ferromagnetic core having first, second and third input windings, a reset winding, a first output winding, and a second output winding;

a second ferromagnetic core having first, second and third input windings;

said first, second, and third input windings of said second ferromagnetic core each being electrically connected in series with a different one of said first, second and third input windings of said first ferromagnetic core and each having one-third the number of turns of said first ferromagnetic core;

said second ferromagnetic core having a reset winding with the same number of turns wound in the same direction as the reset winding on said first ferromagnetic core and being electrically connected in series with said reset winding of said first ferromagnetic core;

said second ferromagnetic core having a first output winding with the same number of turns being electrically connected in series with, and being wound in the same direction as the first output winding of said first ferromagnetic core;

said second ferromagnetic core having a second output winding with the same number of turns wound in the same direction as said second output winding of said first ferromagnetic core and being electrically connected in series with said second output winding of said first ferromagnetic core;

a third ferromagnetic core having first, second and third input windings;

said first, second, and third input windings of said third ferromagnetic core being wound in the same direction as said first, second, and third input windings of said first and second ferromagnetic cores;

said first, second and third input windings of said third ferromagnetic core each being connected in series with a corresponding one of said first, second, and third input windings of said first and second ferromagnetic cores and each having twice as many turns as said first, second, and third input windings of said second ferromagnetic core;

said third ferromagnetic core having a reset winding with the same number of turns and wound in the same direction as said reset windings on said first and second ferromagnetic cores and being in series with said reset windings in said first and second ferromagnetic cores;

said third ferromagnetic core having a first output winding electrically connected in series with said first output windings of said first and second ferromagnetic cores and wound in the opposite direction with the same number of turns as said first output winding of said first and second ferromagnetic cores;

a fourth ferromagnetic core having first, second, and third input windings;

said first, second, and third input windings of said fourth ferromagnetic core each being electrically connected in series with a corresponding one of said first, second and third input windings of said first, second and third ferromagnetic cores and each having the same number of turns in the same direction as said first, second and third input windings of said third ferromagnetic core;

said fourth ferromagnetic core having a reset winding electrically connected in series with said reset windings of said first, second, and third ferromagnetic cores and wound in the same direction with twice as many turns as said reset windings on said first, second and third ferromagnetic cores; and said fourth ferromagnetic core having a first output winding electrically connected in series with said first output windings of said first, second, and third ferromagnetic cores and having the same number of turns in the same direction as said first output winding on said first and second ferromagnetic cores.

11. An adder comprising:

a first ferromagnetic core having first, second and third input windings adapted to receive binary input pulses;

each of said first, second, and third input windings having sufficient turns to saturate said first ferromagnetic core upon receiving the binary bit of a predetermined one of two values;

said first ferromagnetic core having a reset winding and an output winding;

a second ferromagnetic core having first, second, and third input windings each being electrically connected to a corresponding one of said first, second, and third input windings of said first ferromagnetic core;

each of said first, second, and third input windings of said second ferromagnetic core having one-third as many turns in the same direction as said first, second, and third input windings of said first ferromagnetic core;

said second ferromagnetic core having a reset winding electrically connected in series with said reset windings of said first ferromagnetic core;

said second ferromagnetic core having an output winding of the same number of turns in the same direction as and electrically connected in series with said output winding of said first ferromagnetic core; and a third ferromagnetic core having first, second and third input windings each being electrically connected in series with corresponding ones of said first, second and third input windings of said first and second ferromagnetic cores;

said first, second, and third input windings of said third ferromagnetic core having twice as many turns in the same direction as said first, second, and third input windings of said second ferromagnetic core;

said third ferromagnetic core having a reset winding electrically connected in series with said reset windings of said first and second ferromagnetic cores; said third ferromagnetic core having an output winding electrically connected in series with said output winding of said first and second ferromagnetic core and having the same number of turns in the opposite direction as said output windings of said first and second ferromagnetic cores.

12. A digital adder having an analog output comprising:

first, second, and third input terminals for receiving digital input signals;

a first ferromagnetic core having only a single input winding, said winding being electrically connected to said first input terminal, having a reset winding, and having an output winding;

a second ferromagnetic core having only a single input winding, said winding being electrically connected to said second input terminal, having a reset winding, and having an output winding electrically connected in series with said output winding of said first ferromagnetic core; and a third ferromagnetic core having only a single input winding, said winding being electrically connected to said third input terminal, having a reset winding, and having an output winding electrically connected in series with said output windings of said first and second ferromagnetic cores for deriving an analog output signal representative of the sum of said digital input signals.

References Cited

UNITED STATES PATENTS

| | | | |
|---|---|---|---|
| 2,733,860 | 2/1956 | Rajchman | 235—61 |
| 2,954,550 | 9/1960 | Starr et al. | 340—347 |
| 3,016,196 | 1/1962 | Mallery | 235—176 |
| 3,021,070 | 2/1962 | Mallery | 235—176 |
| 3,094,611 | 6/1963 | Karnaugh | 235—175 |
| 3,105,875 | 10/1963 | David | 340—347 |
| 3,123,817 | 3/1964 | Golden | 340—347 |
| 3,188,481 | 6/1965 | Bonn et al. | 307—88 |
| 3,210,529 | 10/1965 | Hanson | 235—176 |
| 3,223,983 | 12/1965 | Hespenheide | 340—174 |
| 3,223,986 | 12/1965 | Clark | 340—174 |

OTHER REFERENCES

Freedman, A. L., "Magnetic Core Matrices for Logical Functions," Electronic Engineering, June 1959, pp. 358–361.

MALCOLM A. MORRISON, *Primary Examiner.*

M. J. SPIVAK, V. SIBER, *Assistant Examiners.*